United States Patent
Negi et al.

(10) Patent No.: US 11,962,496 B2
(45) Date of Patent: *Apr. 16, 2024

(54) METHOD FOR ESTABLISHING SEGMENT ROUTING FOR IPv6 TUNNEL

(71) Applicant: Huawei Technologies Co., Ltd., Shenzhen (CN)

(72) Inventors: Mahendra Singh Negi, Bengaluru (IN); Prejeeth Kaladharan, Bengaluru (IN); Wumin Huang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,456

(22) Filed: Sep. 14, 2022

(65) Prior Publication Data
US 2023/0006924 A1    Jan. 5, 2023

Related U.S. Application Data

(63) Continuation of application No. 16/741,163, filed on Jan. 13, 2020, now Pat. No. 11,483,235, which is a
(Continued)

(30) Foreign Application Priority Data

Jul. 14, 2017    (IN) ............... 201741025136

(51) Int. Cl.
*H04L 45/50* (2022.01)
*H04L 45/00* (2022.01)
(Continued)

(52) U.S. Cl.
CPC ............ *H04L 45/50* (2013.01); *H04L 45/12* (2013.01); *H04L 45/34* (2013.01);
(Continued)

(58) Field of Classification Search
None
See application file for complete search history.

(56) References Cited

U.S. PATENT DOCUMENTS

| 8,885,463 | B1 | 11/2014 | Medved et al. |
| 8,953,597 | B2* | 2/2015 | Chen ............ H04L 45/02 370/408 |

(Continued)

FOREIGN PATENT DOCUMENTS

| CN | 102893558 A | 1/2013 |
| CN | 105991437 A | 10/2016 |
| WO | 2012109566 A2 | 8/2012 |

OTHER PUBLICATIONS

Sgambelluri, A., et al., "SON and PCE implementations for segment routing," 20th European Conference on Networks and Optical Communications, (NOC), Jun. 2015, XP055768141, 5 pages.
(Continued)

*Primary Examiner* — Bob A Phunkulh
(74) *Attorney, Agent, or Firm* — Conley Rose, P.C.

(57) ABSTRACT

A method for establishing a segment routing (SR) tunnel based on an Internet Protocol version 6 (IPv6) data plane using a Path Computation Element Communication Protocol (PCEP) includes generating, by a path computation element (PCE), a first PCEP message, wherein the first PCEP message comprises indicating information and segment identifier (SID), and wherein the indicating information indicates that the SID is an IPv6 prefix of a node in a tunnel; receiving, by a first path computation client (PCC), the first PCEP message from the PCE; and establishing, by the first PCC, a Segment Routing over IPv6 (SRv6) tunnel from the first PCC to a second PCC.

22 Claims, 8 Drawing Sheets

Related U.S. Application Data continuation of application No. PCT/CN2018/091976, filed on Jun. 20, 2018.

(51) Int. Cl.
*H04L 45/12* (2022.01)
*H04L 61/2592* (2022.01)
*H04L 61/5007* (2022.01)
*H04L 47/125* (2022.01)
*H04L 101/35* (2022.01)
*H04L 101/659* (2022.01)

(52) U.S. Cl.
CPC ...... *H04L 61/2592* (2013.01); *H04L 61/5007* (2022.05); *H04L 47/125* (2013.01); *H04L 2101/35* (2022.05); *H04L 2101/659* (2022.05)

(56) References Cited

U.S. PATENT DOCUMENTS

| | | | |
|---|---|---|---|
| 9,660,897 | B1 | 5/2017 | Gredler |
| 9,667,525 | B2* | 5/2017 | Jocha ............... H04L 45/42 |
| 2008/0219272 | A1 | 9/2008 | Novello et al. |
| 2010/0208733 | A1* | 8/2010 | Zhao ............... H04L 45/48 370/390 |
| 2011/0206035 | A1 | 8/2011 | Lee et al. |
| 2011/0211445 | A1* | 9/2011 | Chen ............... H04L 45/16 370/254 |
| 2012/0069740 | A1 | 3/2012 | Lu et al. |
| 2012/0092986 | A1* | 4/2012 | Chen ............... H04L 45/22 370/228 |
| 2012/0188906 | A1 | 7/2012 | Ong |
| 2012/0195229 | A1* | 8/2012 | Chen ............... H04L 45/12 370/254 |
| 2012/0207467 | A1* | 8/2012 | Lee ............... H04J 14/0257 398/16 |
| 2012/0213224 | A1* | 8/2012 | Chen ............... H04L 45/16 370/390 |
| 2013/0007266 | A1* | 1/2013 | Jocha ............... H04L 45/10 709/224 |
| 2014/0003232 | A1* | 1/2014 | Guichard ............ H04L 67/1029 370/230 |
| 2015/0103844 | A1 | 4/2015 | Zhao et al. |
| 2015/0109902 | A1 | 4/2015 | Kumar et al. |
| 2015/0249593 | A1 | 9/2015 | Alvarez et al. |
| 2015/0256456 | A1 | 9/2015 | Previdi et al. |
| 2015/0256465 | A1 | 9/2015 | Mack-Crane et al. |
| 2017/0005922 | A1 | 1/2017 | Tantsura et al. |
| 2017/0064717 | A1 | 3/2017 | Filsfils et al. |
| 2017/0171068 | A1* | 6/2017 | Morper ............... H04L 45/66 |
| 2017/0187615 | A1 | 6/2017 | Beeram et al. |
| 2017/0250907 | A1 | 8/2017 | Pignataro et al. |
| 2017/0331574 | A1* | 11/2017 | Tang ............... H04J 3/0638 |
| 2017/0346720 | A1 | 11/2017 | Lazzeri et al. |
| 2018/0013631 | A1 | 1/2018 | Chen |
| 2018/0145929 | A1 | 5/2018 | Wang et al. |
| 2018/0167335 | A1* | 6/2018 | Lu ............... H04L 47/22 |
| 2018/0198706 | A1 | 7/2018 | Ceccarelli et al. |
| 2019/0190818 | A1 | 6/2019 | Ceccarelli et al. |
| 2019/0280960 | A1 | 9/2019 | Ceccarelli et al. |
| 2020/0084158 | A1* | 3/2020 | Ceccarelli ............. H04L 47/125 |
| 2020/0153732 | A1 | 5/2020 | Negi et al. |
| 2020/0351197 | A1 | 11/2020 | Zhan |
| 2021/0029033 | A1 | 1/2021 | Chen et al. |
| 2021/0092044 | A1 | 3/2021 | Tantsura et al. |
| 2021/0092052 | A1 | 3/2021 | Tantsura et al. |

OTHER PUBLICATIONS

Sivabalan, S., et al., "PCEP Extensions for Segment Routing," draft-ietf-pce-segment-routing-04, May 19, 2015, XP055768324, 22 pages.
Bashandy, A., Ed et al., "IS-IS Extensions to Support Segment Routing over IPv6 Dataplane," draft-bashandy-isis-srv6-extensions-00, Mar. 10, 2017, 16 pages.
Filsfils, C., Ed et al., "Segment Routing Architecture," draft-filsfils-rtgwg-segment-routing-00, Jun. 28, 2013, 28 bages.
Previdi, S., et al., "Ipv6 Segment Routing Header (SRH)," draft-ietf-6man-segment-routing-header-06, Mar. 13, 2017, 35 pages.
Previdi, S., Ed et al., "IS-IS Extensions for Segment Routing draft ietf isis segment routing extensions 00," Apr. 11, 2014, 30 pages.
Kumar, N., et al., "Label Switched Path (LSP) Ping/Traceroute for Segment Routing Networks with MPLS Dataplane," draft-ietf-mpls-spring-lsp-ping-03, Jun. 2, 2017, 19 pages.
Psenak, P., Ed. et al., "OSPF Extensions for Segment Routing," draft-ietf-ospf-segment-routing-extensions-00, Jun. 19, 2014, 33 pages.
Sivabalan, S., et al., "Conveying path setup type in PCEP messages," draft-ietf-pce-lsp-setup-type-04, Apr. 25, 2017, 8 pages.
Sivabalan, S., et al., "PCEP Extensions for Segment Routing," draft-ietf-pce-segment-routing-09, Apr. 10, 2017, 21 pages.
Negi, M., et al., "PCEP Extensions for Segment Routing leveraging the Ipv6 data plane," draft-negi-pce-segment-routing-ipv6-01, Mar. 3, 2018, 17 pages.
E. Rosen, Ed. et al., "The BGP Tunnel Encapsulation Attribute draft-ietf-idr-tunnel-encaps-06", IDR Working Group Internet—Draft, Jun. 14, 2017, total 41 pages.
Kukreja, N., et al., "Demonstration of SDN-Based Orchestration for Multi-Domain Segment Routing Networks," XP032950152, Jul. 10, 2016, 4 pages.
Bashandy, A., Ed., et al., "IS-IS Extensions to Support Routing over IPv6 Dataplane," XP055685004, draft-bashandy-isis-srv6-extensions-OO, Mar. 10, 2017, 16 pages.
Aguilar Cabadas, P., "PCE prototype with segment routing and BGPLS support," XP055413000, Jul. 18, 2014, 88 pages.
Zhao, L., et al., "Ratiometric fluorescent response of electrospun fibrous strips for real-time sensing of alkaline phosphatase in serum," Biosensors and Bioelectronics, 2017, vol. 91, 9 pages.
Kouno, M., et al., "13th, All About SDN," Software Defined Networking, Nikkei Communications, vol. 604, Nikkei Communications, Japan, Nikkei Business Publications, Inc., Nikkei Business Publications, Inc., May 1, 2014, pp. 10 pages.
Xu, X., et al., "PCEP Extensions for Unifed Source Routing-based SFC," draft-xu-pce-sr-sfc-05, Jul. 3, 2017, 13 pages.

* cited by examiner

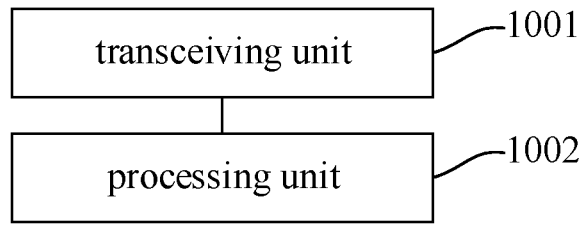
FIG. 9
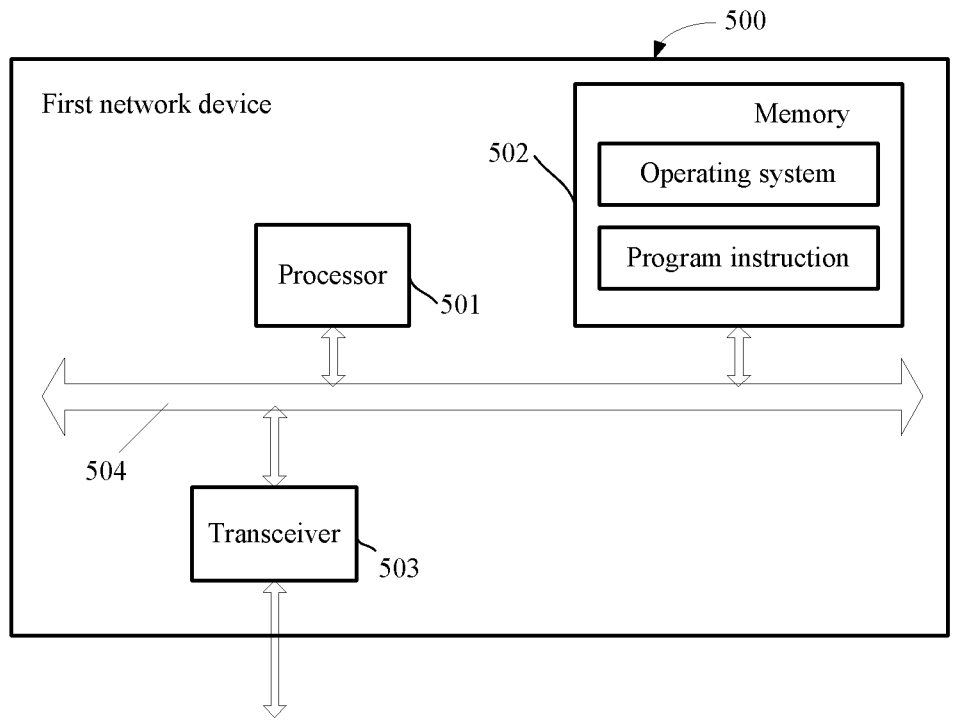
FIG. 10
FIG. 11

METHOD FOR ESTABLISHING SEGMENT ROUTING FOR IPv6 TUNNEL

CROSS-REFERENCE TO RELATED APPLICATIONS

This is a continuation of U.S. patent application Ser. No. 16/741,163 filed on Jan. 13, 2020, which is a continuation of Int'l Patent App. No. PCT/CN2018/091976 filed on Jun. 20, 2018, which claims priority to Indian Patent App. No. 201741025136 filed on Jul. 14, 2017, all of which are incorporated by reference.

TECHNICAL FIELD

The present disclosure described herein, in general, relates to segment routing (SR) and more particularly to a mechanism to support Segment Routing over IPv6 (SRv6) using the Path Computation Element Communication Protocol (PCEP).

BACKGROUND

An SR technology leverages the source routing and tunneling paradigms. It enables any head-end node, i.e., the source node, to choose a path without relying on hop-by-hop signaling protocols in the Multiprotocol Label Switching (MPLS) network, such as Label Distribution Protocol (LDP) or Resource Reservation Protocol-Traffic engineered (RSVP-TE). Each path is specified as a set of "segments" advertised by link-state routing Protocols. A Segment Routed Path can be derived from a variety of mechanisms, including an interior gateway protocol (IGP) Shortest Path Tree (SPT), explicit configuration, or calculated by a Path Computation Element (PCE). Such paths may be chosen by a suitable network planning tool or provisioned on the ingress node.

Reference is made to the Internet Engineering Task Force (IETF) Network Working Group Internet-Draft "Segment Routing Architecture", draft-filsfils-rtgwg-segment-routing-00, for introduction to the SR architecture. The draft-filsfils-rtgwg-segment-routing-00 defines an "IGP Segment or IGP SID" as a segment attached to a piece of information advertised by a link-state routing protocols, e.g. an IGP prefix or an IGP adjacency. Several types of segments are defined. An IGP-Node Segment represents an IGP-Prefix Segment which identifies a specific router (e.g. a loopback). The terms "Node Segment" or "Node-segment identifier (SID)" are often used as an abbreviation. An IGP-Adjacency Segment or Adjacency Segment or Adj-SID represents an IGP segment attached to an unidirectional adjacency or a set of unidirectional adjacencies. An Adjacency Segment is local to the node which advertises it. Both Node segments and Adjacency segments can be used for SR Traffic Engineering (SR-TE).

SR may be performed using extensions to Intermediate System-to-Intermediate System (IS-IS) and Open Shortest Path First (OSPF) protocols. SR can operate with the MPLS data plane or an Internet Protocol version 6 (IPv6) data plane, and SR integrates with multiple service capabilities of the MPLS, including Layer 3 virtual private network (L3VPN), Virtual Private Wire Service (VPWS), Virtual Private LAN Service (VPLS), and Ethernet VPN (EVPN).

The SR architecture can be applied to the MPLS forwarding plane without any change, in which case an SR path corresponds to an MPLS Label Switching Path (LSP). The SR is applied to IPV6 forwarding plane using Segment Routing Header (SRH) as specified in the Internet-draft [I D.ietf-6man-segment-routing-header].

Reference is also made to IETF Internet-Draft draft-ietf-isis-segment-routing-extensions, e.g. draft-ietf-isis-segment-routing-extensions-00, "IS-IS Extensions for Segment Routing". Further, for OSPF Extensions for SR, reference is made to IETF Internet-Draft draft-ietf-ospf-segment-routing-extensions, e.g. draft-ietf-ospf-segment-routing-extensions-00, "OSPF Extensions for Segment Routing".

Reference is also made to IETF Internet-Draft draft-ietf-pce-segment-routing-09, "PCEP Extensions for Segment Routing", April 2017, which provides further details on SR to support SR by MPLS data plane. This document defines a new ERO subobject denoted by "SR-ERO subobject" capable of carrying a SID as well as a node/adjacency identifier (NM) associated with the SID. The SR-capable PCEP speakers (i.e., path computation client (PCC) and PCE) are able to generate and/or process such ERO subobject.

Thus, draft-ietf-pce-segment-routing-09 specifies extensions to the PCEP extensions for supporting an SR-TE 1 sp for MPLS forwarding plane, that allow a stateful PCE to compute and initiate Traffic Engineering (TE) paths, as well as a PCC to request a path subject to certain constraint(s) and optimization criteria in SR networks.

IETF Internet-Draft draft-ietf-6man-segment-routing-header-06, "IPv6 Segment Routing Header (SRH)", discloses that SR can be applied to the IPv6 data plane with the addition of a new type of Routing Extension Header.

However, none of these documents define any mechanism for establishing an SRv6 tunnel based on SR for IPv6 data-plane/forwarding plane.

Thus, there exists a dire need for a mechanism in a PCE-managed software-defined networking (SDN) network to support SRv6.

SUMMARY

This summary is provided to introduce concepts related to a method for establishing an SR tunnel, and the same are further described below in the detailed description.

An objective of the present disclosure is to provide PCEP extensions for establishing an SR tunnel by a PCE-managed SDN based on the IPv6 dataplane. The SRv6 tunnel can be configured in PCC or initiated by PCE.

Another objective of the present disclosure is to provide a PCC or PCE indicating its ability to support IPv6 SR-Path during the PCEP session Initialization phase via a new flag bit in the SR-PCE-CAPABILITY type-length-value (TLV).

Accordingly, in first aspect of the present disclosure there is provided a method for sending data packets in a communications network. The method comprises the steps of generating, by a PCE, a first PCEP message, wherein the first PCEP message comprises an indicating information and a SID field, the SID field comprises multiple SIDs and the indicating information is used to indicate that each of the multiple SIDs is an IPv6 prefix of a node in a tunnel respectively, and sending, by the PCE, the first PCEP message to a first PCC to establish a SRv6 tunnel from the first PCC to a second PCC according to the SIDs and the indicating information.

In one implementation of the first aspect, before generating the first PCEP message, the method comprises the steps of receiving, by the PCE, a second PCEP message from the first PCC, sending, by the PCE, a third PCEP message to the first PCC, wherein, the second PCEP message and the third PCEP message are used to set up an SRv6 capable PCEP session between the first PCC and the PCE, each of the second PCEP message and the third PCEP message carries an SRv6-CAPABILITY TLV field, wherein the Type field of the SRv6-CAPABILITY TLV field is used to indicate that both the PCE and the first PCC support SRv6 forwarding.

Accordingly, in second aspect of the present disclosure there is provided a method in a communications network. This method comprises the steps of receiving, by a first PCC, a first PCEP message from a PCE, wherein the first PCEP message comprises an indicating information and a SID field, the SID field comprises multiple SIDs and the indicating information is used to indicate that each of the multiple SIDs is an IPv6 Prefix of a node in tunnel respectively, and establishing, by the first PCC, a SRv6 tunnel from the first PCC to a second PCC according to the SIDs and the indicating information the SIDs and the indicating information.

In one implementation of the second aspect, before receiving the first PCEP message, the method comprises the steps of sending, by the first PCC, a second PCEP message to the PCE, receiving, by the first PCC, a third PCEP message from the PCE, wherein, the second PCEP message and the third PCEP message are used to set up an SRv6 capable PCEP session between the first PCC and the PCE, each of the second PCEP message and the third PCEP message carries an SRv6-CAPABILITY TLV field, wherein the Type field of the SRv6-CAPABILITY TLV field is used to indicate that both the PCE and the first PCC support SRv6 forwarding.

Significantly, SID field and the indication information can be carried by an Explicit Route Object (ERO) subobject supporting variable length SID for SR IPv6. The ERO subobject in the present application can also be known as SRv6-ERO Subobject. The indicating information can be a bit, i.e. an I-bit of the SRv6-ERO Subobject, modified to support variable length SID for SR IPv6. It indicates that the SID is variable length (i.e. 16 bytes to encode IPv6 Prefix) unlike 4 bytes in old subobjects. The ERO subobjects can be carried in at least one or more of update message (PCUpd) message, PCEP LSP Initiate Request (PCInitiate) message and Path Computation Reply (PCRep) message to convey an explicit-path to the PCC from the PCE.

Optionally, the first PCEP message, which can be a PCInitiate message, or a PCRep message, also comprises a PATH-SETUP-TLV field, where the Type field of the PATH-SETUP-TLV field indicates that the tunnel is established by SRv6 technique. The second PCEP message, which can be a PCReq Message, also comprises an SRv6-CAPABILITY TLV field, where the Type field of the SRv6-CAPABILITY TLV field indicates that the first PCC supports SRv6 forwarding. The third PCEP message, which can be a PCRep Message, also comprises an SRv6-CAPABILITY TLV field, where the Type field of the SRv6-CAPABILITY TLV field indicates that the PCE supports SRv6 forwarding.

Optionally, the PCC configured to send a Path Computation Report (PCRpt) message for updating Link-State-Database (LSDB) to the PCE. The PCE determines IPv6 LSDB through path computation element protocol link state (PCE-PLS) or Border Gateway Protocol link state (BGPLS) or IGP or any combination thereof. The PCE configured to modify said path and sends a PCUpd message to the PCC.

At the outset, both PCC and PCE can exchange SRv6 capability TLV through an Open message, for establishing SRv6 capability during the PCEP session. As an example, the PCC first sends an Open message to PCE to indicate that it is capable of establishing an SRv6 session. In reply, the PCE sends an Open message to PCC to indicate that it is also capable of establishing an SRv6 session. A route record object (RRO) carried in PCRpt message and/or PCReq message sent by PCC, conveys the actual-path from PCC to PCE.

Thus, in other approaches, a forwarding node can compute the SRv6 tunnel path, however it is limited to intra area and optimal inter-area/inter-AS tunnels cannot be setup. In various embodiments of the present disclosure, the PCE may optimally set up intra-area, inter-area and inter-AS SRv6 tunnels. Thus, SR tunnel setup can be achieved by the IPv6 data plane with PCE even if the forwarding network does not support the MPLS.

The various options and preferred embodiments referred to above in relation to the first implementation are also applicable in relation to the other implementations.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer to like features and components.

FIG. 9 illustrates an SRv6-RRO Subobject, in accordance with an embodiment of the present subject matter.

FIG. 10 illustrates a schematic diagram of a PCE according to an embodiment of the present subject matter.

FIG. 11 illustrates a schematic diagram of a PCE according to an embodiment of the present subject matter.

Figure 1:
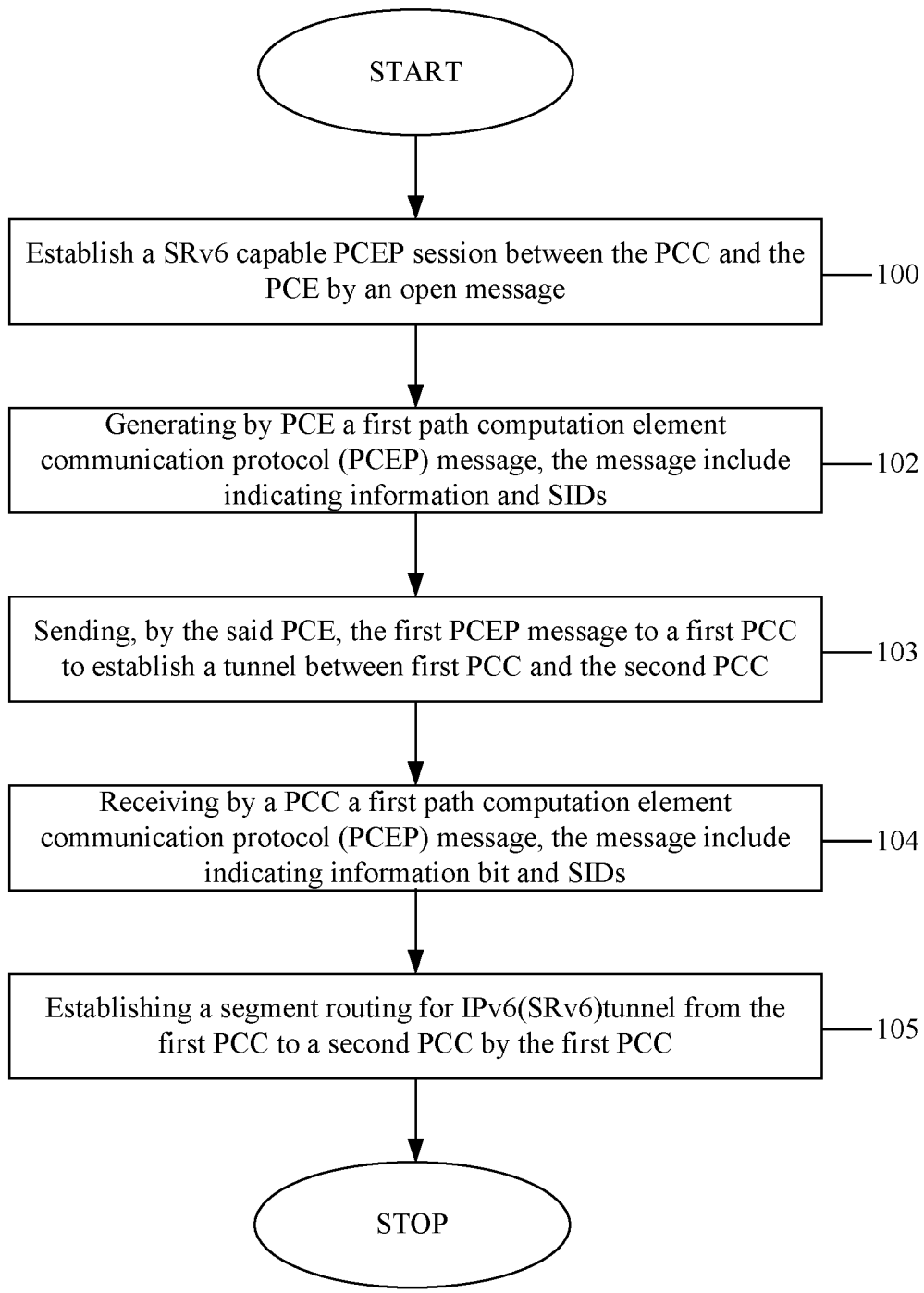
FIG. 1 illustrates the process flow of the method for establishing SRv6 at a PCC or initiated by a PCE, according to a first embodiment of the present disclosure.

It is to be understood that the attached drawings are for purposes of illustrating the concepts of the application and may not be to scale.

DESCRIPTION OF EMBODIMENTS

The application can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the application may take, may be referred to as techniques. In general, the order of the steps of disclosed processes may be altered within the scope of the application.

A detailed description of one or more embodiments of the application is provided below along with accompanying figures that illustrate the principles of the application. The application is described in connection with such embodiments, but the application is not limited to any embodiment. The scope of the application is limited only by the claims and the application encompasses numerous alternatives, modifications and equivalents. Numerous specific details are set forth in the following description in order to provide a thorough understanding of the application. These details are provided for the purpose of example and the application may be practiced according to the claims without some or all of these specific details. For the purpose of clarity, technical material that is known in the technical fields related to the application has not been described in detail so that the application is not unnecessarily obscured.

In the following detailed description, numerous specific details are set forth in order to provide a thorough understanding of the application. However, it will be understood by those skilled in the art that the present application may be practiced without these specific details. In other instances, well-known methods, procedures, and components, modules, units and/or circuits have not been described in detail so as not to obscure the application.

Although embodiments of the application are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the application are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present disclosure teach a method for setting up an SR tunnel based on IPv6 data plane using PCEP extensions. The PCEP runs on a PCC and a PCE to establish the communication between the PCC and the PCE. A PCE is capable of computing a network path or route based on a network graph and applying computational constraints.

While aspects are described for a method for establishing an SR tunnel based on IPv6 data plane by extending PCEP, the present application may be implemented in any number of different computing systems, environments, and/or configurations, the embodiments are describe in the context of the following exemplary systems, devices/nodes/apparatus, and methods.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

The method is applied in a system including a PCC and a PCE, wherein the PCC and the PCE run the PCEP and communication with each other.

The IETF Internet-Draft document (RFC5440), "Path Computation Element (PCE) Communication Protocol (PCEP)", which describes PCEP for communication between a PCC and a PCE or between one a pair of PCEs. In the present disclosure, the basic PCEP operation in SR networks are followed as in the Internet-draft document, draft-ietf-pce-segment routing. SR-IPv6 LSPs computed by a PCE can be represented in one of the following forms.

An ordered set of IPv6 prefix(es) representing network nodes/links.

An ordered set of IPv6 SID(s).

An ordered set of both IPv6 prefix(es) and IPv6 SIDs.

The present disclosure extends the "SR-ERO subobject" as defined in I-D.ietf-pce-segment-routing, to carry IPv6 SID(s) (IPv6 Addresses). The SRH-capable PCEP speakers should be able to generate and/or process such ERO subobject. An ERO containing SR-ERO subobjects can be included in the PCEP Path included in the PCEP PCRep message defined in [RFC5440], the PCInitiate as defined in the Internet Draft document I-D.ietf-pce-pce-initiated-lsp, as well as in the PCEP LSP PCUpd and PCRpt messages defined in defined in Stateful PCE [I-D.ietf-pce-stateful-pce].

The extensions specified in the present disclosure complement the existing PCEP specifications to support SRH path. As such, the PCEP messages (E.g., Path computation Request, Path computation Reply, PCRpt, Path Computation.

Update, Path Computation Initiate, etc.) must be formatted according to the IETF Internet-Draft document (RFC5440), Internet draft I-D.ietf-pce-stateful-pce, Internet draft I-D.ietf-pce-pce-initiated-lsp, and any other applicable PCEP specifications.

The present disclosure uses the following terms which are as follows.

PCC is any client application requesting a path computation to be performed by a Path Computation Element.

PCE is an entity (component, application, or network node) that is capable of computing a network path or route based on a network graph and applying computational constraints.

PCEP: Path Computation Element Protocol.

SR: Segment Routing.

SID: Segment Identifier.

SRv6: Segment Routing over IPv6. SRv6 can also be named as SR-IPv6.

SRH: IPv6 Segment Routing Header.

SRH Path: IPv6 Segment (List of IPv6 SID representing a path in IPv6 SR domain)

The PCC and the PCE according to the embodiment of the present disclosure, includes a processor, a memory, and an interconnection mechanism coupling the memory and a transceiver respectively. The processor may be implemented as one or more microprocessors, microcomputers, microcontrollers, digital signal processors, central processing units, state machines, logic circuitries, and/or any devices that manipulate signals based on operational instructions. Among other capabilities, at least one processor is configured to fetch and execute computer-readable instructions stored in the memory to implement the method of present disclosure.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The PCE and the PCC include a transceiving unit and a processing unit. The transceiving unit is used to perform the action of receiving and sending in the method of the present disclosure, and the processing unit is used to perform the other actions except the transceiving action in the method of the present disclosure. For example, the processing unit of the PCE is configured to generate a first PCEP message, wherein the first PCEP message comprises an indicating information and a SID field, the SID field comprises multiple SIDs and the indicating information is used to indicate that each of the multiple SIDs is an IPv6 prefix of a node in a tunnel respectively, and the transceiving unit of the PCE is configured to send the first PCEP message to a first PCC to establish a SRv6 tunnel from the first PCC to a second PCC according to the SIDs and the indicating information. For another example, the transceiving unit of the PCC is configured to receive a first PCEP message from a PCE, wherein the first PCEP message comprises an indicating information and a SID field, the SID field comprises multiple SIDs and the indicating information is used to indicate that each of the multiple SIDs is an IPv6 Prefix of a node in tunnel respectively, and the processing unit of the PCC is configured to establish a SRv6 tunnel from the first PCC to a second PCC according to the SIDs and the indicating information.

Although the present subject matter is explained considering that the present disclosure is implemented as the PCC or PCE, it may be understood that the PCC or PCE may also be implemented in a variety of computing systems, such as a laptop computer, a desktop computer, a notebook, a workstation, a mainframe computer, a server, a network server, and the like. It will be understood that the PCC or PCE may be accessed by multiple users through one or more user devices (not shown), collectively referred to as user hereinbefore/after, or applications residing on the user devices. Examples of the PCC or PCE may include, but are not limited to, a router, a switch, a controller in a SDN, a portable computer, a personal digital assistant, a handheld device, and a workstation. The PCC and PCE are communicatively coupled to with each other through a network.

In the present disclosure, in order to support SRv6 tunnel, the PCEP is extended to support IPv6 capability (in Open Object/open message), IPv6 prefix SR-Stack (in SR-ERO subobject) and a new path-setup-type (in request parameter (RP)/stateful PCE request parameter (SRP) object). With these extensions, a PCC can create tunnel or a PCE can send request to a PCC for creating a tunnel based on SRv6 (e.g. IPv6 tunnel based on SRH technique defined in IETF draft-ietf-6man-segment-routing-header-06).

In SR networks, an ingress node of an SR path appends all outgoing packets with an SR header (SRH) consisting of a list of SIDs (i.e., IPv6 prefix in case of SRH-IPv6). The header has all necessary information to guide the packets from the ingress node to the egress node of the path, and hence there is no need for any signaling protocol. The present disclosure describes extensions to SR path for IPv6 forwarding-plane. SR-path (i.e., ERO object) consists of an ordered set of SIDs. A PCC or PCE indicates its ability to support IPv6 SR-path during the PCEP session Initialization phase via a new flag in the SR-PCE-CAPABILITY TLV format.

Referring to FIG. 1, which illustrates the process flow of a method for establishing an SR tunnel over an SRv6 configured at a PCC or initiated by PCE, according to an embodiment of the present disclosure. In one method, when PCC configures the tunnel, then before the PCE sending the first PCEP message, receives a second PCEP message from the PCC, wherein the second PCEP message can be PCReq MESSAGE. And the PCE sends a third PCEP message to PCC. The third PCEP message is PCRep MESSAGE.

In the embodiment, the method 100 includes the following steps for sending data packets in a communications network through SRv6 tunnel.

Step 102. Generating, by a PCE, a first PCEP message. wherein the first PCEP message comprises an indicating information and a SID field, the SID field comprises multiple SIDs and the indicating information is used to indicate that each of the multiple SIDs is an IPv6 prefix of a node in a tunnel respectively. Optionally, The first PCEP message can includes an ERO object to carry the indicating information and the SID field. The indicating information can be a bit, but the present disclosure does not limit to this.

Step 103. Sending, by the said PCE, the first PCEP message to a first PCC to establish an SRv6 tunnel from the first PCC to a second PCC according to the SIDs and the indication information.

Step 104. Receiving, by a first PCC, a first PCEP message from a PCE, wherein the first PCEP message comprises an indicating information and a SID field, the SID field comprises multiple SIDs and the indicating information is used to indicate that each of the multiple SIDs is an IPv6 Prefix of a node in tunnel respectively.

Step 105. Establishing, by the first PCC, a SRv6 forwarding plane (SR-IPv6) tunnel from the first PCC to a second PCC according to the SIDs and the indicating information.

In the various embodiments of the present disclosure, the first PCEP message can be selected from a PCInitiate message, the second PCEP message can be selected from a PCReq message, and the third PCEP message can be selected from a PCRep message. The PCEP message can also be selected from a PCUpd or PCRpt.

Figure 2:
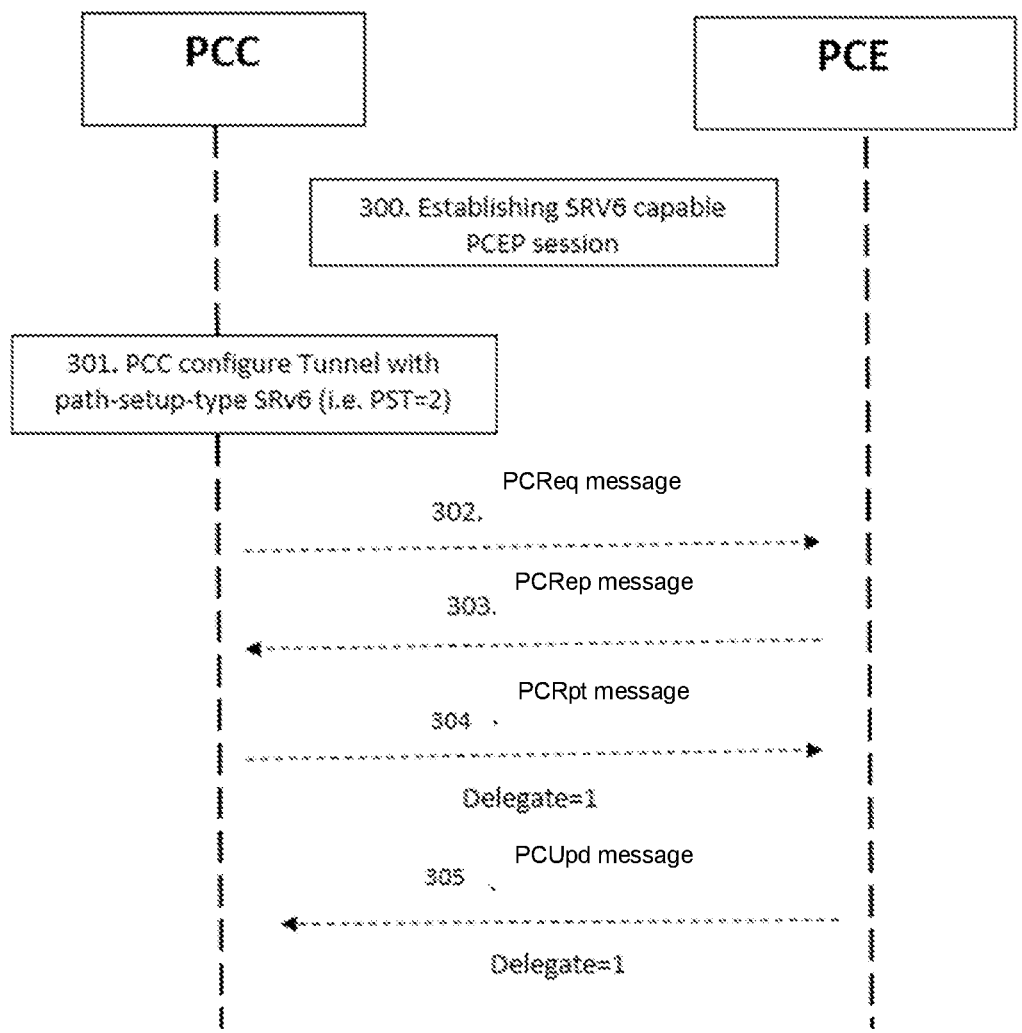
FIG. 2 illustrates the flow chart diagram of SRv6 tunnel configuration at a PCC, according to a first embodiment of the present disclosure.

Referring to FIG. 2, which illustrates the flow chart diagram of a method 200 for configuring SRv6 tunnel initiated by a PCC. It illustrates the followings steps.

Step 300. Establishing SRv6 capable PCEP session by exchange of SRv6 PCE capability TLV in open message.

Step 301. PCC configure tunnel with Path-setup-type SRv6 (i.e. PST=2).

Step 302. PCC sends a PCReq message to PCE.

Step 303. PCE sends a PCRep message to PCC after computing path based on SRv6 path-setup-type (i.e. PST=2).

Step 304. PCC sends PCRpt message to PCE to delegate tunnel, the tunnel status is derived from the connectivity check by bidirectional forwarding detection (BFD) or operations, administration, and management (OAM) mechanism.

Step 305. PCE modifies the path and sends the PCUpd message to PCC.

Figure 3:
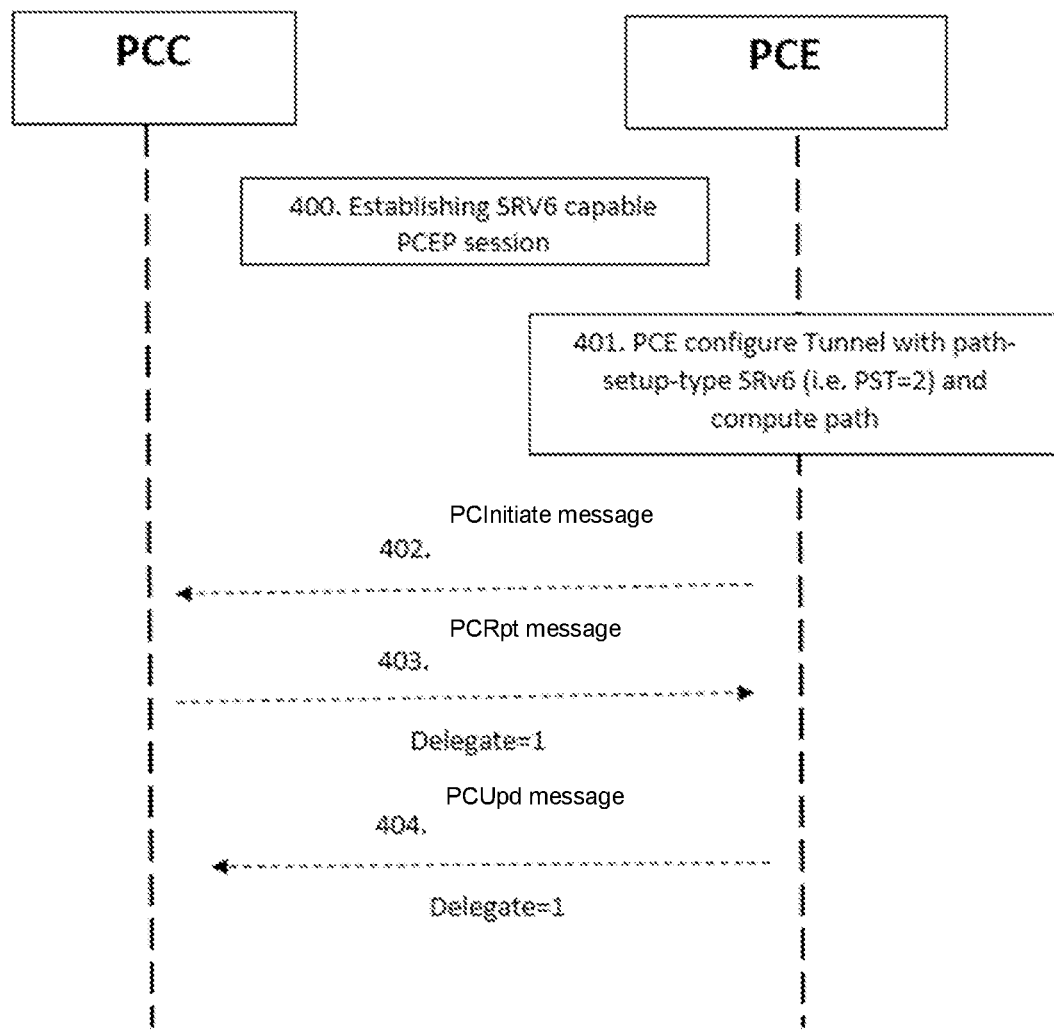
FIG. 3 illustrates the flow chart diagram of SRv6 tunnel initiated by a PCE, according to a second embodiment of the present disclosure.

FIG. 3 illustrates the flow chart diagram of a method 300 for configuring SRv6 tunnel initiated by a PCE. The flow chart diagram of SRv6 tunnel initiated by PCE, according to second embodiment of the present disclosure. It illustrates the following steps.

Step 400. Establishing SRv6 capable PCEP session by exchange of SRv6 PCE capability TLV in open message.

Step 401. PCE configure Tunnel with path-setup-type SRv6 (i.e. PST=2) and compute path based on SRv6 path-setup-type (i.e. PST=2).

Step 402. PCE send PCInitiate message to PCC.

Step 403. PCC sends PCRpt message to PCE to delegate tunnel, the tunnel status is derived from the connectivity check by BFD or OAM mechanism.

Step 404. PCE modifies the path and sends the PCUpd message to PCC.

Figure 4:
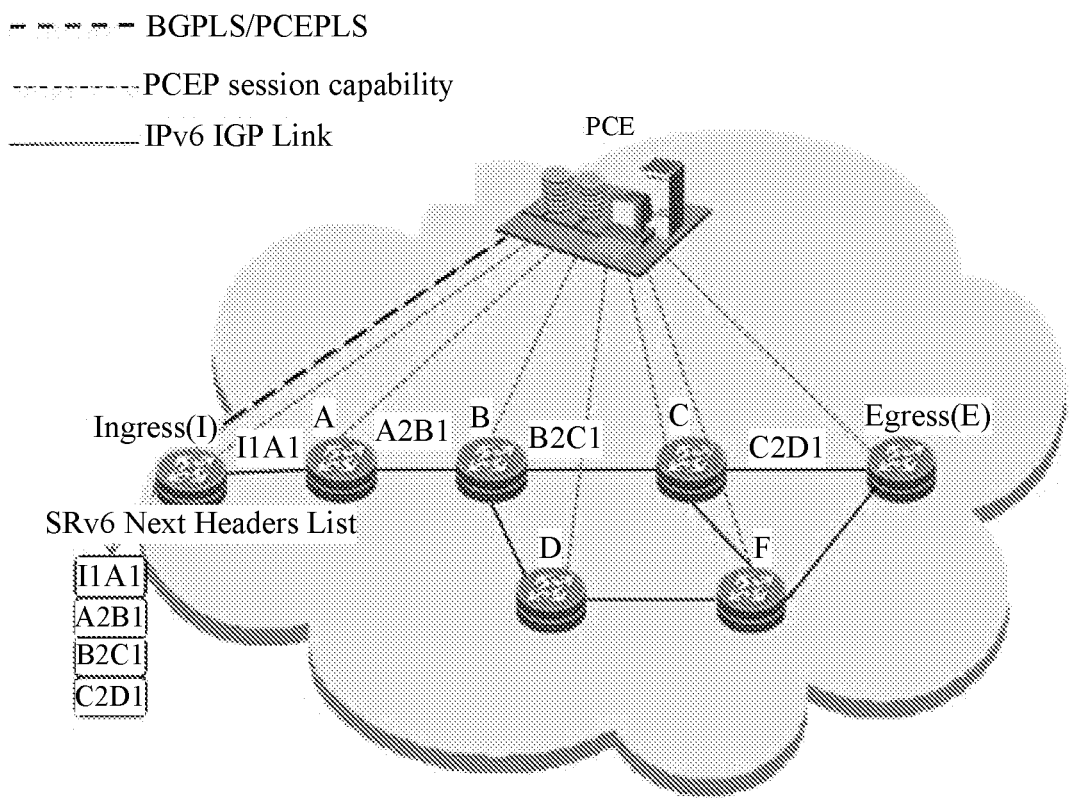
FIG. 4 illustrates the schematic of SRv6 tunnel setup by a PCE, in accordance with an embodiment of the present subject matter.
Figure 8:
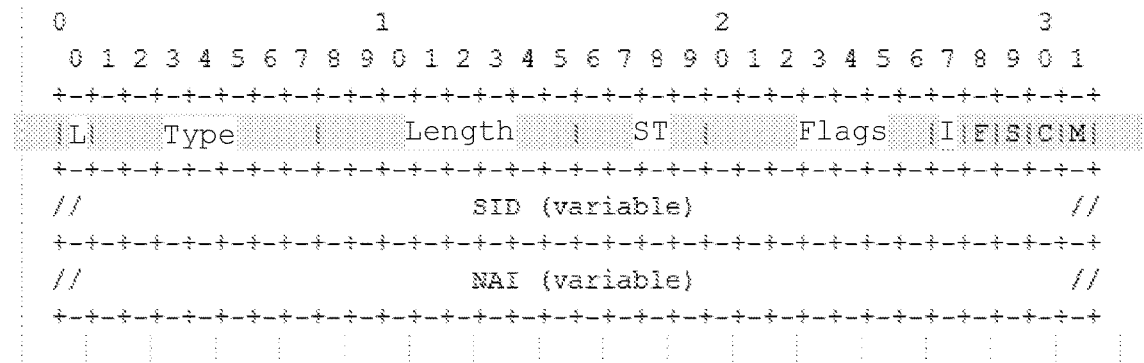
FIG. 8 illustrates an SRv6-ERO Subobject, in accordance with an embodiment of the present subject matter.

The SRv6 tunnel setup by PCE schematic is shown FIG. 4. The PCE send a first PCEP message to the first PCC node (Ingress node). The message contains the ERO according to the format as shown in FIG. 8.

Figure 5:
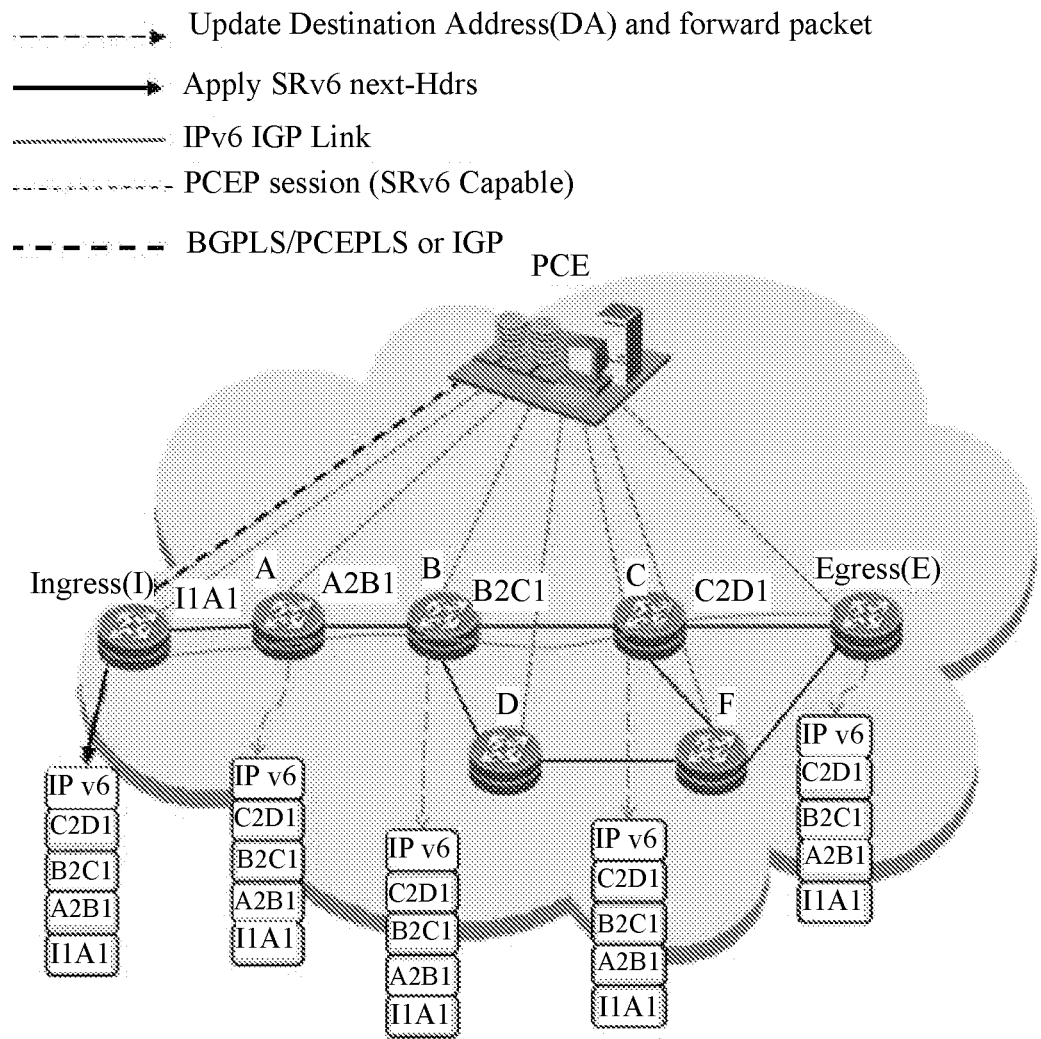
FIG. 5 illustrates the schematic of SRv6 packet forwarding, in accordance with an embodiment of the present subject matter.

Referring to FIG. 5 which illustrates the schematic of SRv6 packet forwarding, based on SRv6 data plane, in accordance with an embodiment of the present subject matter. As shown in the figure, at ingress, PCC downloads SRv6 IPv6 Prefix SIDS as SRv6 Next Headers List. At each transit node, Destination Address (DA) is updated. PCE updates ingress node with SRv6 ERO. On receiving packet at ingress, it applies SRv6 ERO as SRv6 next headers and forwards the packet to A, DA [1A1] (i.e. from the bottom of the next-headers). At A, DA is updated to [A2B1] and packet is forwarded to B. At B, DA is updated to [B2C1] and packet is forwarded to C. At C, DA is updated to [C2D1] and packet is forwarded to E (i.e. Final Destination).

In the embodiment, before generating a first PCEP message, the SRv6 capable PCEP session is establish between PCC and PCE by an OPEN message. In the present disclosure, an SRv6-PCE-CAPABILITY TLV is introduced, but it's an optional TLV associated with the OPEN Object to exchange SR IPv6 capability of PCEP speakers. The PCE and PCC exchange an open message to establish SRv6 capable PCEP session. PCC or PCE must encode the SRv6-PCE-CAPABILITY TLV in the open message. When a PCEP session between a PCC and a PCE is established, both PCEP speakers to exchange their capabilities to indicate their ability to support SRH specific functionality.

Figure 6:
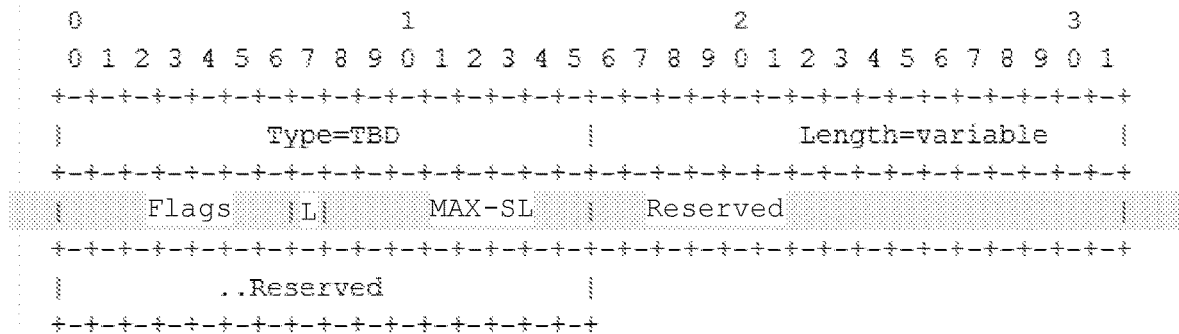
FIG. 6 illustrates a format of SRv6 capability TLV, in accordance with an embodiment of the present subject matter.

The FIG. 6 illustrates the updated format of SRv6 capability TLV, in accordance with an embodiment of the present subject matter. This TLV is for SR based on iPv6 data plane not TE existing one is for SR-TE. The format of the SRv6-PCE-CAPABILITY TLV is shown in the figure. The code point for the TLV type is TBD as defined by IANA. The TLV length is 4 octets and is variable length. The 32-bit value is formatted as follows. The MAX-SL is "Maximum SID Depth" (1 octet) field (MSD) specifies the maximum number of SIDs a PCC is capable of imposing as MPLS labels. The "SRH MSD" (2 octets) field (SRH MSD) specifies the maximum number of SIDs a PCC is capable of imposing as next headers in SRH. "Flags" field is 1 octet long, and the present disclosure defines the following flag.

L-flag. A PCC sets this flag to 1 to indicate that it does not impose any limit on MSD.

The exchanging of SR capability is same as described in the Internet draft-ietf-pce-segment-routing of other approaches. Therefore, the same is not repeated herein to maintain brevity.

In the embodiment, the PCE learns IPv6 LSDB via PCEPLS/BGPLS/IGP protocols. The IPv6 PrefixSIDs are advertised by IGP for each IPv6 adjacency. PCC and PCE must have BGPLS/IGP or PCEPLS (capability), so PCC can update LSDB to PCE. PCE updates network topology based on LSDB received and uses the same to compute path.

In the embodiment PCE encodes SRv6 ERO in PCRep (i.e. if PCReq message is send from PCC to PCE), in PCUpd (i.e. if LSP is delegated from PCC to PCE), in PCInitiate (i.e. if tunnel is initiated by PCE). PCC encodes SRv6 RRO in PCRpt (i.e. in PCRpt send from PCC to PCE).

Figure 7:
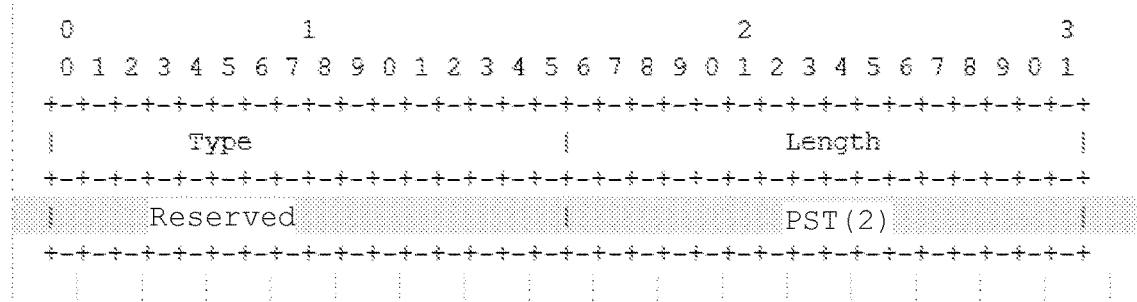
FIG. 7 illustrates path setup type (PST) TLV (PST Type 2 is added), in accordance with an embodiment of the present subject matter.

In one embodiment of the present disclosure, in order to set up a tunnel with IPv6 SRH technique is utilized by PCE to support tunnel setup based on SRv6. The PCC configure Tunnel with path-setup-type SRv6 (i.e. PST=2). A PATH-SETUP-TYPE (2) is defined in PATH-SETUP-TYPE TLV. FIG. 7 illustrates the format of path setup type TLV (PST Type 2 is added). This TLV is encoded in RP/SRP object as specified in Internet-draft document draft-ietf-pce-lsp-setup-type, SRP object can be encoded in PCUpd (to identify the transaction from PCE) and PCRpt (i.e. to match the transaction received from PCE) message.

Referring to FIGS. 8 and 9, which illustrate an SRv6-ERO Subobject and SRv6-RRO Subobject, respectively, in accordance with an embodiment of the present disclosure, whereby SID is the SID and NM contains the NM associated with the SID.

In the embodiment, SR-ERO/SR-RRO subobject is modified to support variable length SID for SR IPv6. Indicating information, i.e., a bit (I), is introduced, which indicates SID is variable length (i.e. 16 bytes to encode IPv6 Prefix) unlike 4 bytes in old subobjects. ERO object is encoded in PCUpd, PCInitiate or PCRep message, to convey the explicit-path to PCC from PCE. RRO object is encoded in PCRpt message to convey the actual-path to PCE from PCC, RRO object also can be encoded in PCReq message.

In one embodiment, for supporting IPv6 SID(s), indicating information, i.e., a new bit (I), is set in existing SR-ERO sub object. If I bit is set, then SR-ERO sub object consists of a 32-bit header followed by the IPv6 SID and the NM associated with the IPv6 SID. If I-bit is set, length field is variable unlike defined in the Internet Draft document, I-D.ietf-pce-segment-routing. The SR-ERO Subobject format is shown in FIG. 9. The fields in the SR-ERO Subobject are as follows. The 'L' Flag as defined in the Internet draft document I-D.ietf-pce-segment-routing. Type as defined in the Internet draft-ietf-pce-segment-routing. Length contains the total length of the subobject in octets, including the L, Type and Length fields. Length must be a multiple of 4. As mentioned earlier, an SR-ERO subobject must have at least SID or NM. The length should take into consideration SID or NM only if they are not null. The flags described below used to indicate whether SID or NM field is null. SID Type (ST) indicates the type of information associated with the SID contained in the object body. ST values are defined in draft-ietf-pce-segment-routing. For SRH path, valid ST values are 2 and 4.

Flags are used to carry any additional information pertaining to SID. In the embodiment of the present disclosure, new bit(I) is defined.

M. When this bit is set, the SID value represents an MPLS label stack entry as specified in [RFC5462] where only the label value is specified by the PCE.

I. When this bit is set, the SID value represents an IPv6 SRH stack entry as specified in [I-D.ietf-6man-segment-routing-header]. If M bit is set I bit must not be set and vice-versa, otherwise PCEP speaker must send a PCErr message with Error-Type=10 ("Reception of an invalid object") and Error Value=TBD ("Bad SID format").

Other bits are as defined in draft-ietf-pce-segment-routing.

In the embodiment, the ERO processing remains same except processing for new flag bit(I) defined and variable SID (i.e.PrefixSID), if a PCEP speaker does not support PrefixSID it must send PCErr message with Error-Type=4 (Not supported object) and Error-Value=2 (Not supported object Type). If M bit is set I bit must not be set and vice-versa, otherwise PCEP speaker must send a PCErr message with Error-Type=10 ("Reception of an invalid object") and Error Value=TBD ("Bad SID Format").

In order to support SRH only SR-ERO sub-object is modified, other RRO related subobjects and processing must follow as specified in the Internet Draft I-D.ietf-pce-segment-routing. AN SRIPv6-ERO subobject consists of a 32-bit header followed by the variable (SID) PrefixSID and the NAI associated with the PrefixSID.

In the embodiment, a PCEP speaker that does not support the SR PCEP capability cannot recognize the SR-ERO or SR-RRO subobjects with new (I) flag must send a PCEP error with Error-Type=4 (Not supported object) and Error-Value=2 (Not supported object Type) as per [RFC5440].

Accordingly, some of the noteworthy features of the present disclosure are as follows. AN SRv6 capability TLV is introduced in open message exchanged during PCEP session. An indicating information expressed as a bit (I) is defined in SR-ERO and SR-RRO subobject. A PATH-SETUP-TYPE (2) is introduced to support tunnel setup base on IPv6 SR (SRv6).

Although implementations for establishing an SRv6 tunnel by extending PCEP have been described in language specific to structural features and/or methods, it is to be understood that the appended claims are not necessarily limited to the specific features or methods described. Rather, the specific features and methods are disclosed as examples of implementations of the method for establishing SRv6 tunnel by extending PCEP.

The embodiments of the present disclosure provides a PCE in a network. FIG. 10 is schematic diagram of the PCE according to an embodiment of the present disclosure. Other parts of the PCE can refer to the existing technology of PCE and not be described in the present disclosure.

As shown in FIG. 10, the PCE includes a transceiving unit 1001 and a processing unit 1002. Wherein, the transceiving unit 1001 is configure to perform the receiving action and sending action performed by the PCE in the method 100, 200 or 300 as shown in FIGS. 1-3, and the processing unit 1002 is configured to perform the other actions except the receiving action and the sending action in the method 100, 200 or 300. For example, the processing unit 1002 is configured to generate a first PCEP message, wherein the first PCEP message comprises an indicating information and a SID field, the SID field comprises multiple SIDs and the indicating information is used to indicate that each of the multiple SIDs is an IPv6 prefix of a node in a tunnel respectively, and the transceiving unit 1001 is configured to send the first PCEP message to a first PCC to establish a SRv6 tunnel from the first PCC to a second PCC according to the SIDs and the indicating information. The detailed description refer to the above method embodiments and details are not described herein again.

Corresponding to the method shown in FIG. 1-FIG. 3, an embodiment of the present disclosure further provides a PCE 600. Referring to a schematic diagram shown in FIG. 11, the PCE may include a processor 501, a memory 502, a transceiver 503, and a bus system 504.

The bus system 504 is configured to connect the processor 501, the memory 502, and the transceiver 503.

The transceiver 503 is configure to perform the receiving action and sending action performed by the PCE in the method 100, 200 or 300 as shown in FIGS. 1-3.

The memory 502 is configured to store a program instruction and data.

The processor 501 is configured to read the program instruction and data that are stored in the memory 502 to perform the other actions except the receiving action and the sending action in the method 100, 200 or 300. For example, the processor 501 is configured to generate a first PCEP message, wherein the first PCEP message comprises an indicating information and a SID field, the SID field comprises multiple SIDs and the indicating information is used to indicate that each of the multiple SIDs is an IPv6 prefix of a node in a tunnel respectively, and the transceiver 603 is configured to send the first PCEP message to a first PCC to establish a SRv6 tunnel from the first PCC to a second PCC according to the SIDs and the indicating information. The detailed description refer to the above method embodiments and details are not described herein again.

Figure 12:
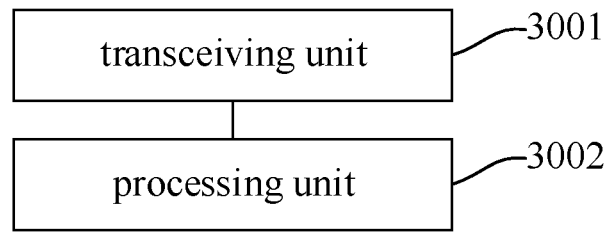
FIG. 12 illustrates a schematic diagram of a PCC according to an embodiment of the present subject matter.

As shown in FIG. 12, the PCC includes a transceiving unit 3001 and a processing unit 3002. Wherein, the transceiving unit 3001 is configure to perform the receiving action and sending action performed by the PCC in the method 100, 200 or 300 as shown in FIGS. 1-3, and the processing unit 3002 is configured to perform the other actions except the receiving action and the sending action in the method 100, 200 or 300. For example, the transceiving unit 3001 is configured to receive a first PCEP message from a PCE, wherein the first PCEP message comprises an indicating information and a SID field, the SID field comprises multiple SIDs and the indicating information is used to indicate that each of the multiple SIDs is an IPv6 Prefix of a node in tunnel respectively, and the processing unit 3002 is configured to establish a SRv6 tunnel from the first PCC to a second PCC according to the SIDs and the indicating information. The detailed description refer to the above method embodiments and details are not described herein again.

Figure 13:
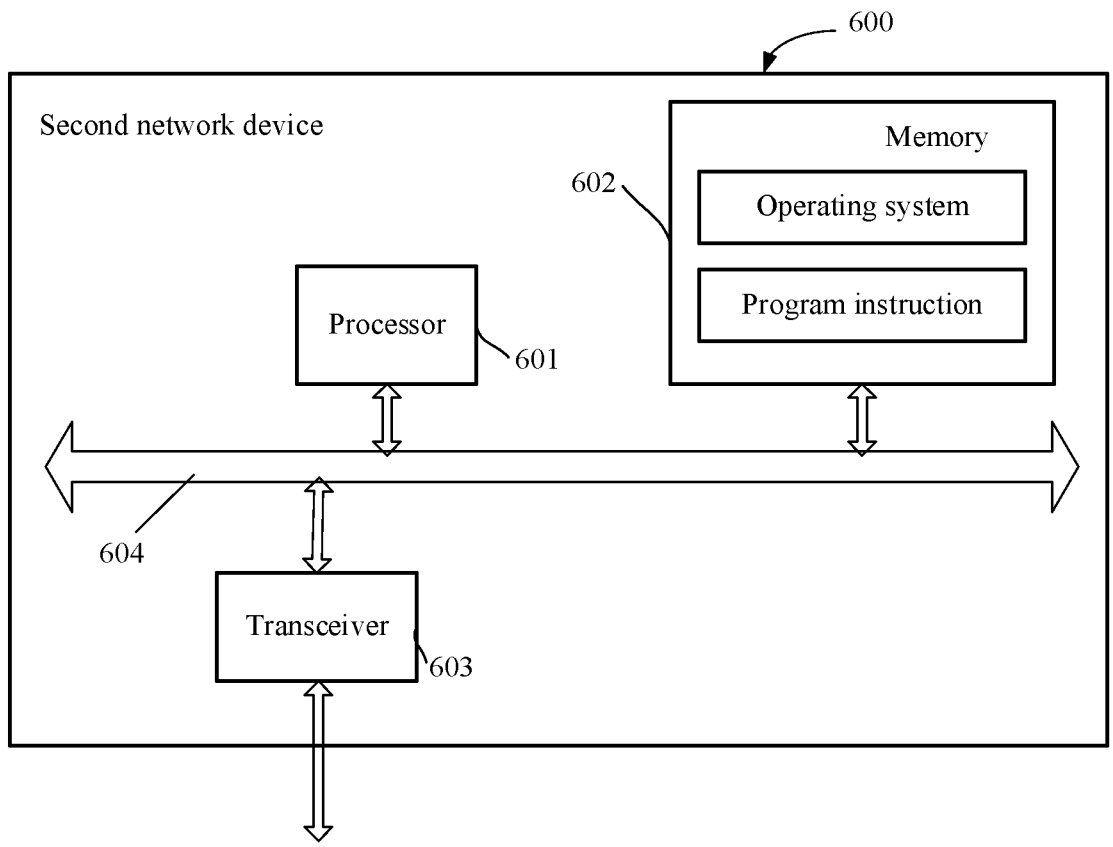
FIG. 13 illustrates a schematic diagram of a PCC according to an embodiment of the present subject matter.

Corresponding to the method shown in FIG. 1-FIG. 3, an embodiment of the present disclosure further provides a PCC 600. Referring to a schematic diagram shown IN FIG. 13, the PCC may include a processor 601, a memory 602, a transceiver 603, and a bus system 604.

The bus system 604 is configured to connect the processor 601, the memory 602, and the transceiver 603.

The transceiver 603 is configure to perform the receiving action and sending action performed by the PCE in the method 100, 200 or 300 as shown in FIGS. 1-3.

The memory 602 is configured to store a program instruction and data.

The processor 601 is configured to read the program instruction and data that are stored in the memory 602 to perform the other actions except the receiving action and the sending action in the method 100, 200 or 300. For example, the transceiver 603 is configured to receive a first PCEP message from a PCE, wherein the first PCEP message comprises an indicating information and a SID field, the SID field comprises multiple SIDs and the indicating information is used to indicate that each of the multiple SIDs is an IPv6 Prefix of a node in tunnel respectively, and the processor 601 is configured to establish a SRv6 tunnel from the first PCC to a second PCC according to the SIDs and the indicating information. The detailed description refer to the above method embodiments and details are not described herein again.

The processor in the present disclosure may be implemented as one or more microprocessors, microcomputers, microcontrollers, digital signal processors, central processing units, state machines, logic circuitries, and/or any devices that manipulate signals based on operational instructions. Among other capabilities, at least one processor is configured to fetch and execute computer-readable instructions stored in the memory to implement the method of present disclosure.

A system is provided, where the system includes a PCE according to any one of the above PCE and a PCC according to any one of the above PCC.

From the foregoing descriptions of the implementation manners, a person skilled in the art may clearly understand that some or all steps of the methods in the embodiments may be implemented by software in addition to a universal hardware platform. Based on such an understanding, the technical solutions of the present disclosure essentially or the part contributing to other approaches may be implemented in a form of a software product. The software product may be stored in a storage medium, such as a ROM, a RAM, a magnetic disk, or an optical disc, and includes several instructions for instructing a computer device (which may be a personal computer, a server, or a network device such as media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, network device and system embodiments are basically similar to a method embodiment, and therefore are described briefly, for related parts, reference may be made to partial descriptions in the method embodiment. The described network device embodiment is merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. A person of ordinary skill in the art may understand and implement the embodiments of the present disclosure without creative efforts.

The foregoing descriptions are merely optional embodiments of the present disclosure, but are not intended to limit the protection scope of the present disclosure. It should be noted that a person of ordinary skill in the art may make certain improvements and polishing without departing from the principle of the present disclosure and the improvements and polishing shall fall within the protection scope of the present disclosure.

What is claimed is:

1. A method implemented by a path computation element (PCE) and comprising:
    receiving, from a path computation client (PCC), a first Path Computation Element Communication Protocol (PCEP) message comprising a first Segment Routing over Internet Protocol version 6 (SRv6) capability type-length-value (TLV) indicating that the PCC supports SRv6;
    sending, to the PCC, a second PCEP message comprising a second SRv6 capability TLV indicating that the PCE supports SRv6; and
    sending, to the PCC, a third PCEP message comprising an explicit route object (ERO),
    wherein the ERO comprises an SRv6-ERO subobject, and wherein the SRv6-ERO subobject comprises an SRv6 segment identifier (SID).

2. The method of claim 1, wherein the third PCEP message further comprises a path-setup-type TLV, and wherein a type of the path-setup-type TLV is defined for SRv6.

3. The method of claim 1, wherein the third PCEP message is a path computation initiate (PCInitiate) message.

4. The method of claim 1, wherein the third PCEP message is a path computation reply (PCRep) message.

5. The method of claim 1, wherein the SRv6-ERO subobject further comprises indication information indicating that the SRv6-ERO subobject comprises the SRv6 SID.

6. A method implemented by a path computation client (PCC) and comprising:
    sending, to a path computation element (PCE), a first Path Computation Element Communication Protocol (PCEP) message comprising a first Segment Routing over Internet Protocol version 6 (SRv6) capability type-length-value (TLV) indicating that the PCC supports SRv6;
    receiving, from the PCE, a second PCEP message comprising a second SRv6 capability TLV indicating that the PCE supports SRv6; and
    receiving, from the PCE, a third PCEP message comprising an explicit route object (ERO),
    wherein the ERO comprises an SRv6-ERO subobject, and wherein the SRv6-ERO subobject comprises an SRv6 segment identifier (SID).

7. The method of claim 6, wherein the third PCEP message further comprises a path-setup-type TLV, and wherein a type of the path-setup-type TLV is defined for SRv6.

8. The method of claim 6, wherein the third PCEP message is a path computation initiate (PCInitiate) message.

9. The method of claim 6, wherein the third PCEP message is a path computation reply (PCRep) message.

10. The method of claim 6, wherein the SRv6-ERO subobject comprises indication information indicating that the SRv6-ERO subobject comprises the SRv6 SID.

11. A path computation element (PCE) comprising:
    a memory configured to store instructions; and
    one or more processors coupled to the memory and configured to execute the instructions to cause the PCE to:
        receive, from a first path computation client (PCC), a first Path Computation Element Communication Protocol (PCEP) message comprising a first Segment Routing over Internet Protocol version 6 (SRv6) capability type-length-value (TLV) indicating that the PCC supports SRv6;
        send, to the PCC, a second PCEP message comprising a second SRv6 capability TLV indicating that the PCE supports SRv6; and
        send, to the PCC, a third PCEP message comprising an explicit route object (ERO),
        wherein the ERO comprises an SRv6-ERO subobject, and
        wherein the SRv6-ERO subobject comprises a first SRv6 segment identifier (SID).

12. The PCE of claim 11, wherein the third PCEP message further comprises a path-setup-type TLV, and wherein a type of the path-setup-type TLV is defined for SRv6.

13. The PCE of claim 11, wherein the third PCEP message is a path computation initiate (PCInitiate) message.

14. The PCE of claim 11, wherein the third PCEP message is a path computation reply (PCRep) message.

15. The PCE of claim 11, wherein the SRv6-ERO subobject further comprises indication information indicating that the SRv6-ERO subobject comprises the SRv6 SID.

16. The PCE of claim 11, wherein the one or more processors are is further configured to execute the instructions to cause the PCE to receive, from the PCC, a fourth PCEP message comprising an SRv6 route record object (SRv6-RRO) subobject, and wherein the SRv6-RRO subobject comprises a second SRv6 SID.

17. A path computation client (PCC) comprising:
a memory configured to store instructions; and
one or more processors coupled to the memory and configured to execute the instructions to cause the PCC to:
send, to a path computation element (PCE), a first Path Computation Element Communication Protocol (PCEP) message comprising a first Segment Routing over Internet Protocol version 6 (SRv6) capability type-length-value (TLV) indicating that the PCC supports SRv6;
receive, from the PCE, a second PCEP message comprising a second SRv6 capability TLV indicating that the PCE supports SRv6; and
receive, from the PCE, a third PCEP message comprising an explicit route object (ERO),
wherein the ERO comprises an SRv6-ERO subobject, and
wherein the SRv6-ERO subobject comprises a first SRv6 segment identifier (SID).

18. The PCC of claim 17, wherein the third PCEP message further comprises a path-setup-type TLV, and wherein a type of the path-setup-type TLV is defined for SRv6.

19. The PCC of claim 17, wherein the third PCEP message is a path computation initiate (PCInitiate) message.

20. The PCC of claim 17, wherein the third PCEP message is a path computation reply (PCRep) message.

21. The PCC of claim 17, wherein the SRv6-ERO subobject further comprises indication information indicating that the SRv6-ERO subobject comprises the SRv6 SID.

22. The PCC of claim 17, wherein the one or more processors are further configured to execute the instructions to cause the PCC to send, to the PCE, a fourth PCEP message comprising an SRv6 route record object (SRv6-RRO) subobject, and wherein the SRv6-RRO subobject comprises a second SRv6 SID.

* * * * *